(12) United States Patent
Farhan et al.

(10) Patent No.: US 8,064,205 B2
(45) Date of Patent: Nov. 22, 2011

(54) STORAGE DEVICES INCLUDING DIFFERENT SETS OF CONTACTS

(75) Inventors: Munif M. Farhan, Round Rock, TX (US); James R. Utz, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 798 days.

(21) Appl. No.: 12/123,110

(22) Filed: May 19, 2008

(65) Prior Publication Data

US 2009/0284902 A1 Nov. 19, 2009

(51) Int. Cl.
*H05K 1/14* (2006.01)

(52) U.S. Cl. ......................... 361/737; 710/100

(58) Field of Classification Search .................. 361/600, 361/679.01, 679.31; 710/100
See application file for complete search history.

(56) References Cited

U.S. PATENT DOCUMENTS

| | | | |
|---|---|---|---|
| 4,683,550 A * | 7/1987 | Jindrick et al. | 708/140 |
| 5,459,850 A * | 10/1995 | Clay et al. | 711/171 |
| 5,544,334 A * | 8/1996 | Noll | 710/306 |
| 5,577,213 A * | 11/1996 | Avery et al. | 710/100 |
| 5,615,085 A * | 3/1997 | Wakabayashi et al. | 361/702 |
| 6,126,332 A * | 10/2000 | Cubbage et al. | 710/2 |
| 6,141,210 A * | 10/2000 | Iwasaki | 361/679.31 |
| 7,051,128 B2 * | 5/2006 | Bando | 710/100 |
| 7,184,274 B2 * | 2/2007 | Wu et al. | 361/752 |
| 2004/0143716 A1 * | 7/2004 | Hong | 711/170 |
| 2005/0216628 A1 * | 9/2005 | Chou | 710/100 |
| 2006/0139854 A1 * | 6/2006 | Beyers et al. | 361/600 |
| 2008/0094788 A1 * | 4/2008 | Choe | 361/681 |

* cited by examiner

*Primary Examiner* — Lisa Lea Edmonds
*Assistant Examiner* — Xanthia C Cunningham
(74) *Attorney, Agent, or Firm* — Larson Newman, LLP (57) ABSTRACT

A storage device can include a first outer surface and a second outer surface opposite the first outer surface. The storage device can further include first and second sets of contacts arranged to couple to first and second connectors, respectively. The first outer surface can be closer to the first set of contacts than the second set of contacts, and the second outer surface can be closer to the second set of contacts than the first set of contacts. In a particular embodiment, the storage device can include a circuit board having first and second major surfaces. The first and second sets of contacts are disposed on the first and second major surfaces, respectively. The storage device can be in a form of a solid-state drive. Further, the storage device can be communicatively coupled to a process of an information handling system.

21 Claims, 6 Drawing Sheets

STORAGE DEVICES INCLUDING DIFFERENT SETS OF CONTACTS

FIELD OF THE DISCLOSURE

This disclosure relates generally to information handling systems, and more particularly to storage devices including different sets of contacts.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. For example, much of the following focuses on information handling systems having printed circuit boards with quality verification test structures and methods for testing test structures. However, other teachings may certainly be utilized in this application. The teachings may also be utilized in other applications and with several different types of architectures such as distributed computing architectures, client/server architectures, or middleware server architectures and associated components.

Figure 1:
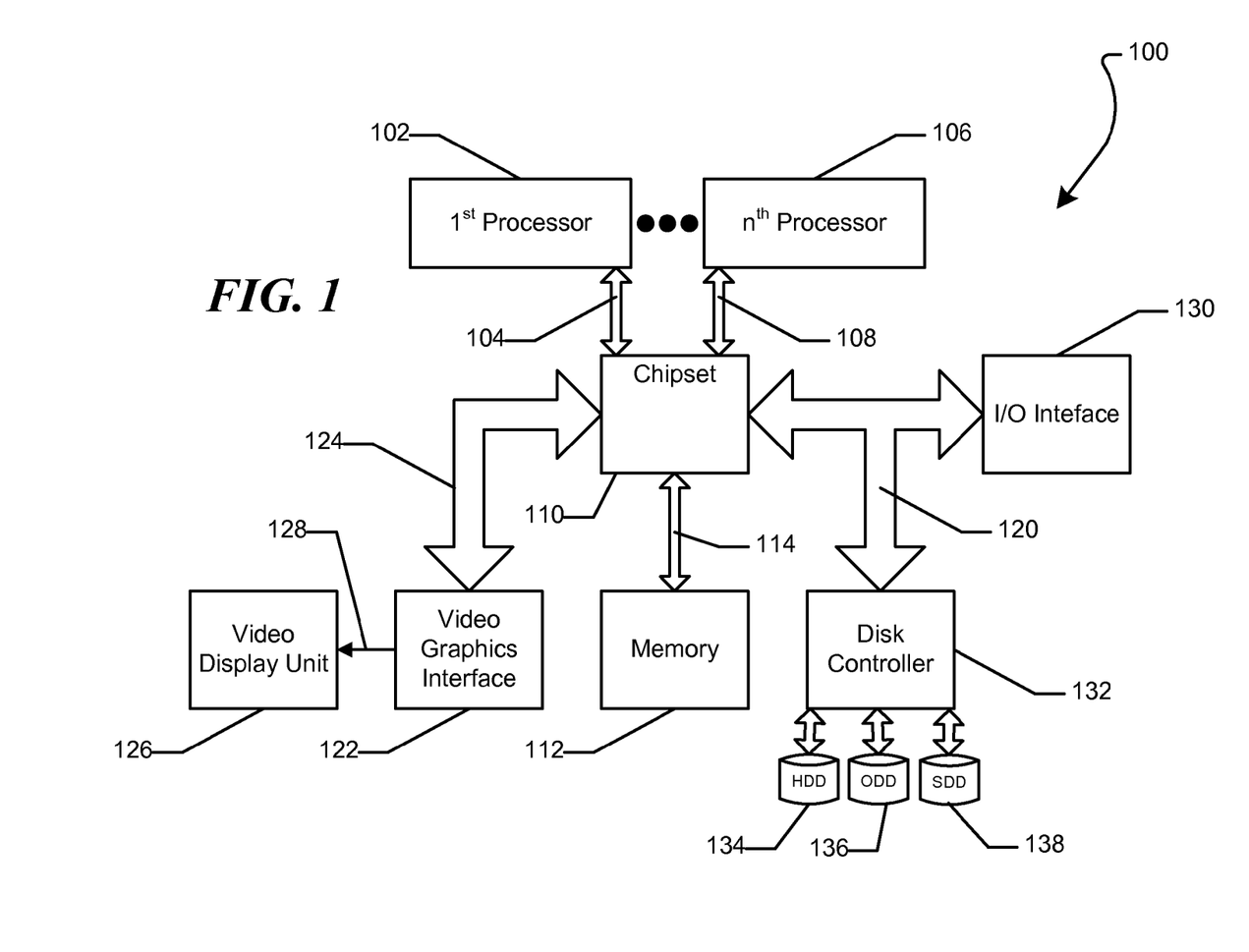
FIG. 1 is a block diagram illustrating an information handling system according to one aspect of the disclosure.

FIG. 1 illustrates a block diagram of an exemplary embodiment of an information handling system, generally designated at 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to $n^{th}$ host bus 108. The first physical processor 102 can be coupled to a chipset 110 via the first host bus 104. Further, the $n^{th}$ physical processor 106 can be coupled to the chipset 110 via the $n^{th}$ host bus 108. The chipset 110 can support multiple processors and can allow for simultaneous processing of multiple processors, and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 106 using the $n^{th}$ host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers among the buses 104, 108, and 114.

According to another aspect, the chipset 110 generally can be considered an application specific chipset that provides connectivity to various buses, and integrates other system functions. For example, the chipset 110 can be provided using an Intel® Hub Architecture (IHA) chipset that can also include two parts, a Graphics and Accelerated Graphics Port (AGP) Memory Controller Hub (GMCH) and an I/O Controller Hub (ICH). For example, an Intel 820E chipset, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an AGP interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 MHz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using the first bus 104 and the second bus 108 coupled to the n$^{th}$ physical processor 106. The chipset 110 can also include a Southbridge portion (not illustrated) of the chipset 110 and can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 coupled to the I/O bus 120. The disk controller 132 can handle communication between the information handling system 100 and one or more internal disk drives, such as a hard disk drive (HDD) 134, an optical disk drive (ODD) 136, and a solid state drive (SSD) 138. The ODD 136 can include a Read/Write Compact Disk (R/W CD), a Read/Write Digital Video Disk (R/W DVD), a Read/Write mini-Digital Video Disk (R/W mini-DVD), or other type of optical disk drive.

Figure 2:
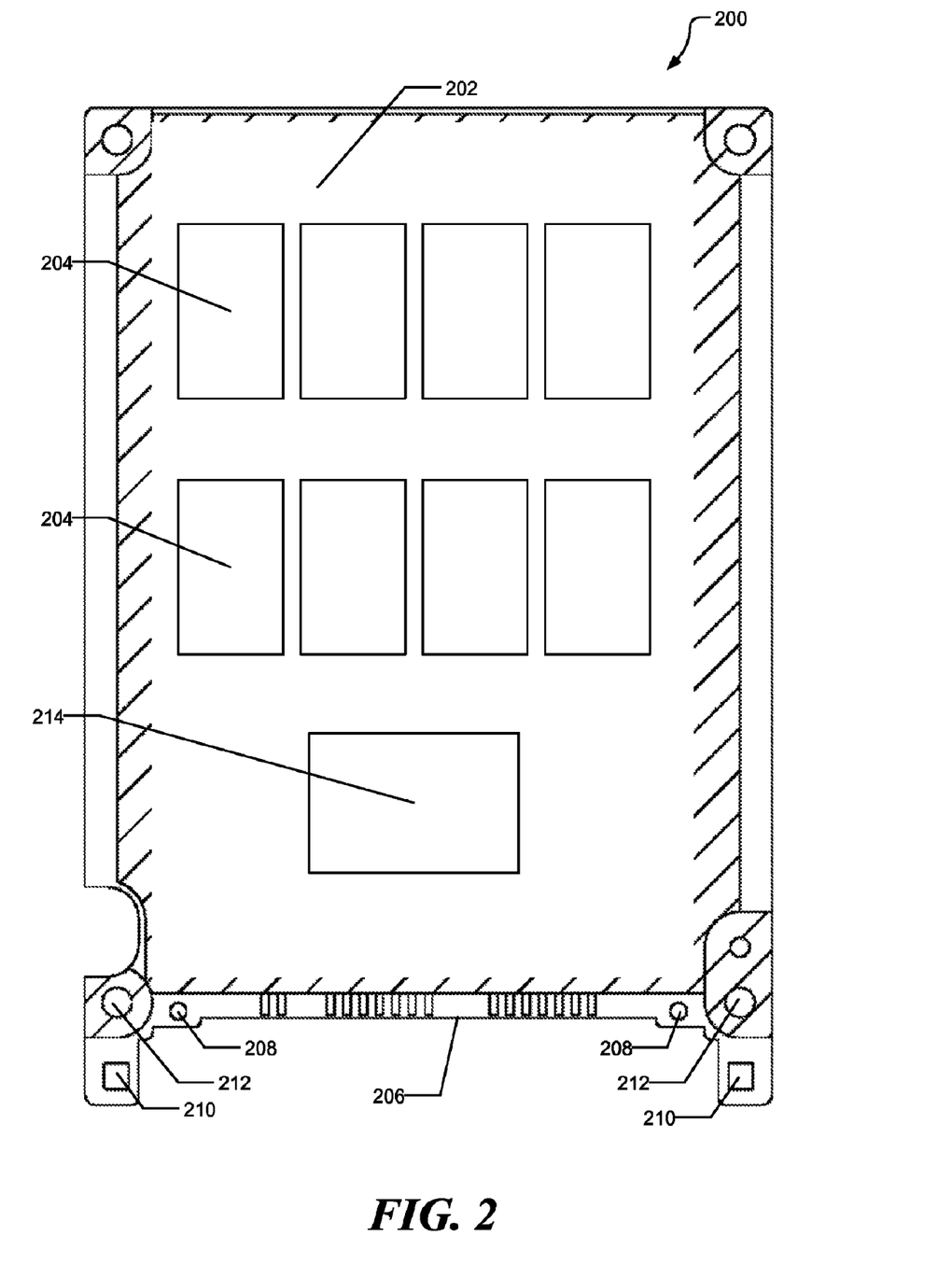
FIG. 2 is a schematic diagram illustrating a top view of an exemplary SSD.

FIG. 2 illustrates a top view of an exemplary SSD 200, such as SSD 138. Referring to FIG. 2, SSD 200 can include a circuit board 202. Non-volatile memory chips 204 can be mounted on circuit board 202. The non-volatile memory chips 204 may be flash memory, such as a NAND flash memory or a NOR flash memory. Additionally, the circuit board 202 can include alignment holes 208 and attachment points 210 for the placement of a connector, such as a SCSI connector, a Serial Advanced Technology Attachment (SATA) connector, a serial attached SCSI (SAS) connector, a micro SATA connector, or the like. Further, circuit board 202 can include mounting holes 212 and an alignment notch 214. The mounting holes 212 can be used for mounting SSD 200 within an information handling system, such as by using a mounting bracket of other mounting adaptor. SSD 200 can further include an I/O chip 214. I/O chip 214 can manage the storage media and the communication between an information handling system, such as information handling system 100 and the non-volatile memory chips 204.

Figure 3:
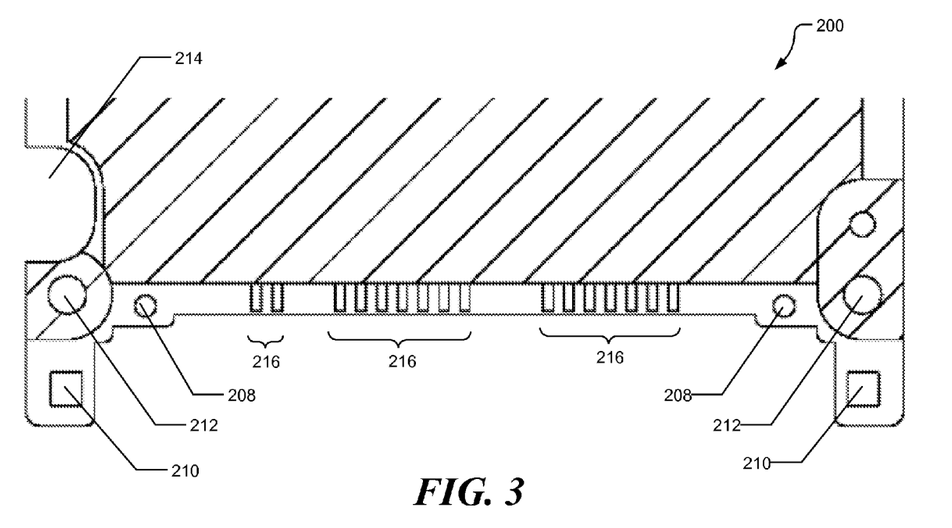
FIG. 3 is a schematic diagram illustrating an exemplary micro SATA connector for use with an SSD.

FIG. 3 illustrates a detailed top view of SSD drive 200 to illustrate some of the features near the end that couples to a disk controller. A set of contacts 216 can be adjacent to an edge 206 of the circuit board 200. The set of contacts 216 can be arranged to conform to a standard, such as the SATA or micro SATA connector standards as defined in the Serial ATA Revision 2.6 Specification, the SAS connector standard as defined in the SAS 1.1 Standard, or another suitable standard. The standard can define a number, a function, and an arrangement for the set of contacts 216. The set of contacts 216 can electrically couple the connector to the circuit board 202 when connector 500 is attached to the circuit board 202.

Figure 4:
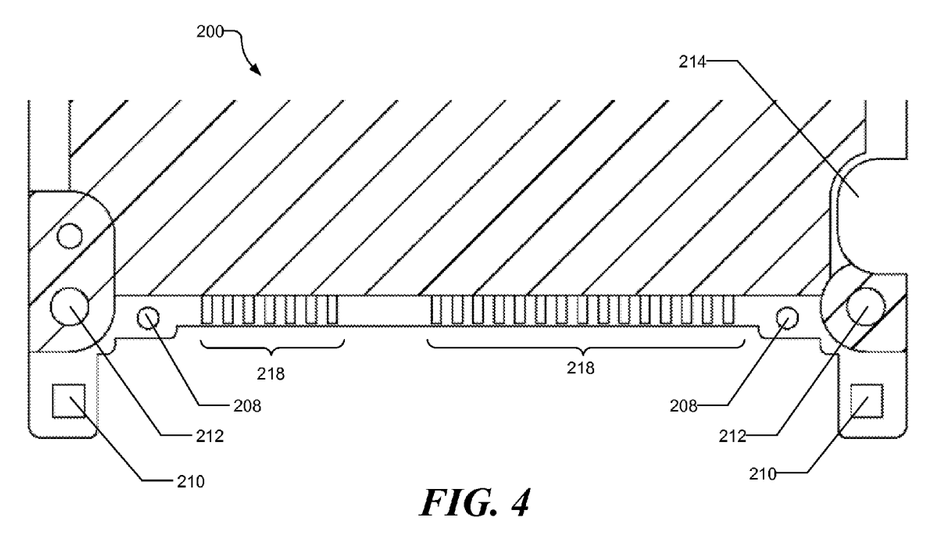
FIG. 4 is a schematic diagram illustrating a detailed top view of an exemplary SSD.

FIG. 4 illustrates a detailed bottom view of the SSD drive 200 to illustrate features along the opposite side of the SSD 200. A set of contacts 218 can be adjacent to the edge 206 of the circuit board 200. The set of contacts 218 can be arranged to conform to any of the standards described with respect to the set of contacts 216. However, the arrangement of the set of contacts 218 conforms to a different standard compared to the set of contacts 216. The different standard can define a number, a function, and an arrangement for the set of contacts 218. The set of contacts 218 can electrically couple the connector to the circuit board 202 when the connector is attached to the circuit board 202.

Figure 5:
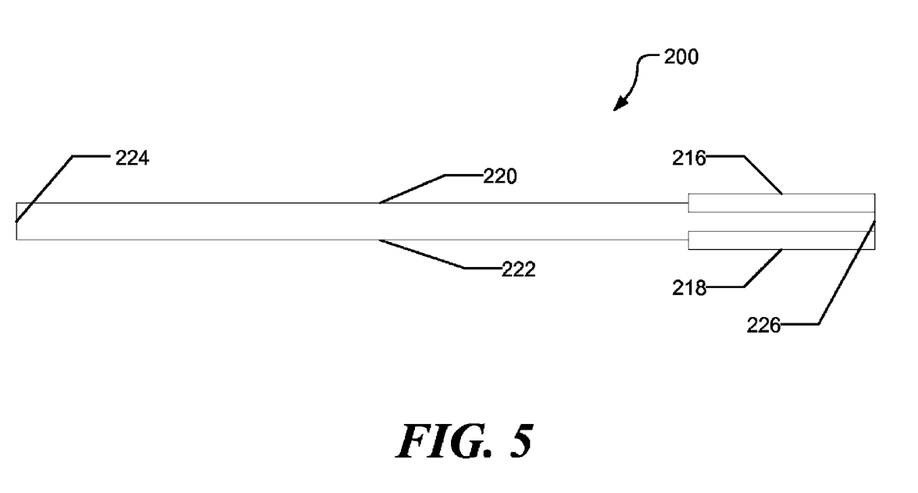
FIG. 5 is a schematic diagram illustrating a side view of an exemplary SSD.

FIG. 5 illustrates a side view of the SSD drive 200 to illustrate features of the SSD 200. The SSD 200 includes outer surfaces 220 and 222 and ends 224 and 226. The end 226 can be configured to couple to a disk controller, such as disk controller 132. The SSD 200 and the disk controller can be coupled through a cable. Additionally, power can be supplied to the SSD 200 through the end 226, such as through the same cable or a separate cable. In an exemplary embodiment, the set of contacts 216 and the set of contacts 218 can be arranged near the end 226 of the SSD 200. The outer surface 220 can be closer to the set of contacts 216 than the set of contacts 218. Additionally, the outer surface 222 can be closer to the set of contacts 218 than to the set of contacts 216. In an exemplary embodiment, the set of contacts 216 can be adjacent to outer surface 220 and the set of contacts 218 can be adjacent to outer surface 222. In an alternate embodiment, the set of contacts 216 can be arranged near the end 226 and adjacent to the outer surface 220 and the set of contacts 218 can be arranged near the end 224 and adjacent to the outer surface 222.

Figure 6:
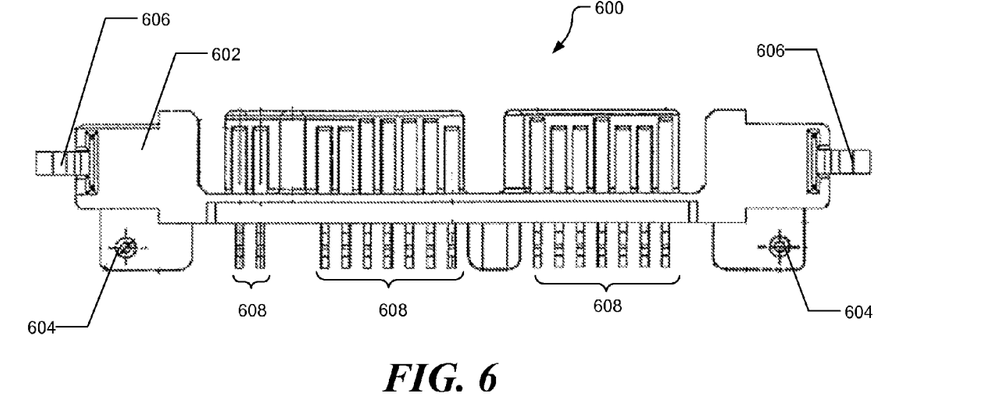
FIG. 6 is a schematic diagram illustrating an exemplary SATA connector for use with an SSD.

FIG. 6 illustrates bottom view of a micro SATA connector 600 that can connect to a set of contacts conforming to the micro SATA standard, such as the set of contacts 216. Micro SATA connector 600 can include a housing 602 having alignment pegs 604 and attachment elements 606. The alignment pegs 604 can be aligned with the alignment holes 208 (in FIG. 2) of circuit board 202. Additionally the attachment elements 606 can couple with the attachment points 210 to fixedly attach micro SATA connector 600 to the circuit board 202. Further, micro SATA connector 600 can include a set of pins 608 arranged according to a standard, such as the Serial ATA Revision 2.6 Specification. The set of pins 608 can couple to the set of contacts 216 when the micro SATA connector is attached to the SSD 200. The standard can define a number, a function, and an arrangement for the set of pins 608. Additionally, the specification can define certain size and shape characteristics of the housing 602 of micro SATA connector 600.

Figure 7:
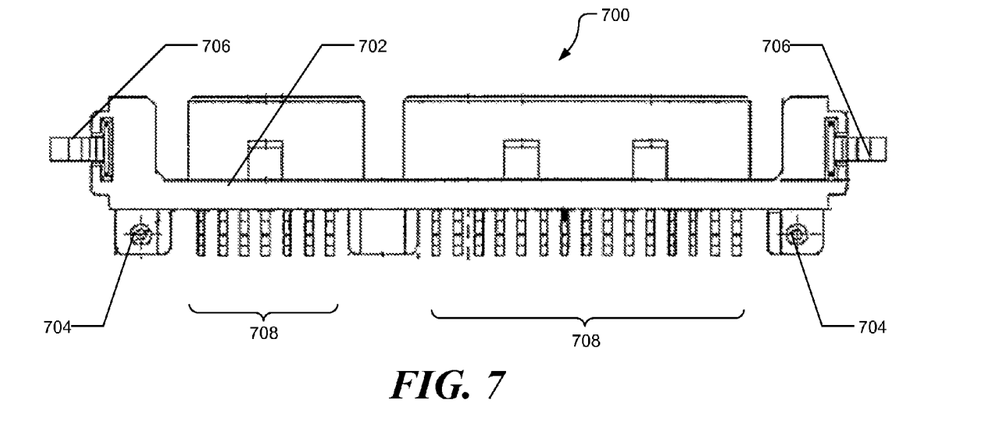
FIG. 7 is a schematic diagram illustrating a detailed bottom view of an exemplary SSD.

FIG. 7 illustrates a SATA connector 700 that can connect to a set of contacts conforming to the SATA connector standard, such as the set of contacts 218. SATA connector 700 can include a housing 702 having alignment pegs 704 and attachment elements 706. The alignment pegs 704 can be aligned with the alignment holes 208 (in FIG. 2) of circuit board 202. Additionally the attachment elements 706 can couple with the attachment points 210 to fixedly attach SATA connector 700 to the circuit board 202. Further, SATA connector 600 can include a set of pins 708 arranged according to a standard, such as the Serial ATA Revision 2.6 Specification. The set of pins 708 can couple to the set of contacts 218 when the SATA connector is attached to the SSD 200. The standard can define a number, a function, and an arrangement for the set of pins 708. Additionally, the specification can define certain size and shape characteristics of the housing 702 of SATA connector 700.

In an embodiment, SSD 200 can be adaptable for use with either micro SATA connector 600 or SATA connector 700. In a first example, micro SATA connector 600 can be coupled to SSD 200. During assembly, selector elements can be added in a first location to enable the set of contacts 216 coupled to micro SATA connector 600. In a second example, SATA connector 700 can be coupled to SSD 200. During assembly, selector elements can be added in a second location to enable the set of contacts 218 couple to SATA connector 700. Selector elements may be zero ohm resistors or electrical vias used to terminate the SATA bus towards either the set of contacts 216 or the set of contacts 218.

In an alternate embodiment, SSD 200 can provide both micro SATA connector 600 and SATA connector 700. A selection element, such as a jumper or DIP switch, can be provided to select between micro SATA connector 600 or SATA connector 700. Alternatively, circuitry can be provided to automatically select between micro SATA connector 600 or SATA connector 700 when the SSD 200 is connected to an information handling system. For example, circuitry may enable the set of contacts 216 when power is detected from the micro SATA connector 600 and may enable the set of contacts 218 when power is detected from SATA connector 700.

Figure 8:
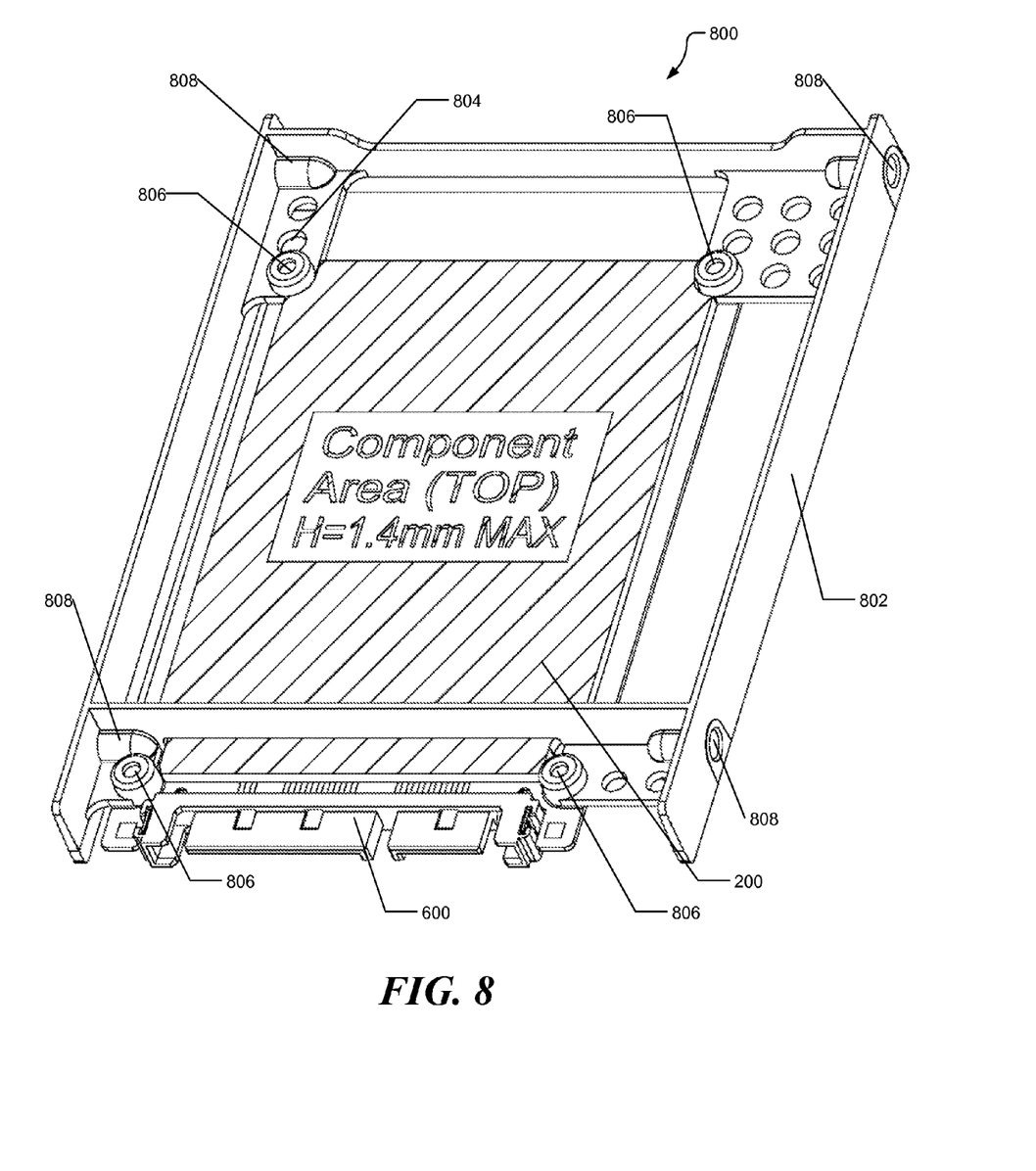
FIG. 8 is a schematic diagram illustrating a mounting bracket for use with an SSD.

FIG. 8 illustrates a mounting bracket 800 for use with SSD 200. Mounting bracket 800 can include a frame 802. In an embodiment, the frame 802 can be sized to fit a 2.5 inch drive bay. Alternatively, the frame 802 can be sized to fit a 3.5 inch drive bay or a 6.25 inch drive bay. The frame 802 can include mounting holes 804 and coupling elements 806 for mounting SSD 200 within the frame 802. Coupling elements 806 can be screws, pins, or other elements capable of couple mounting holes 212 of SSD 200 to the mounting holes 804 of the frame 802. In an embodiment, the frame 802 can include additional mounting holes 804 to accommodate SSDs of various sizes. Further, the frame 802 can include mounting points 808 for attaching the mounting bracket 800 to a drive bay. In an embodiment, mounting points 808 can be threaded holes such that screws can be used to attach the mounting bracket 800 to the drive bay. In an alternate embodiment, the frame 802 can include rails so that the mounting bracket 800 can slide into a drive slot.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a storage device can include a circuit board having first and second major surfaces. Further, the storage device can include a first set of contacts on the first major surface and a second set of contacts on the second major surface. The first set of contacts arranged to couple to a first connector and the second set of contacts arranged to couple to a second connector. In an embodiment of the first aspect, the first connector is a micro SATA connector. In another embodiment of the first aspect, the second connector is a SATA connector. In a further embodiment of the first aspect, the storage device can further include flash memory mounted on the first major surface or the second major surface. In a particular embodiment, the flash memory can include NAND flash memory. In another particular embodiment, the flash memory includes NOR flash memory.

In another embodiment of the first aspect, the storage device can further include a selection element attached to the circuit board. The selection element can enable one of the first set of contacts and the second set of contacts. In an additional embodiment of the first aspect, the storage device can include a drive bracket connected to the circuit board. The drive bracket can be configured for mounting in a 2.5 inch drive bay. In an alternate embodiment, the drive bracket can be configured for mounting in a 3.5 inch drive bay.

In a second aspect, an information handling system includes a processor and a SSD in communication with the processor. The SSD can include a circuit board having first and second major surfaces. Further, the SSD can include a first set of contacts on the first major surface and a second set of contacts on the second major surface. The first set of contacts can be arranged to couple to a first connector and the second set of contacts can be arranged to couple to a second connector. In an embodiment of the second aspect, the SSD can further include flash memory mounted on one of the first and second major surfaces. In a particular embodiment, the flash memory can include NAND flash memory. In another particular embodiment of the second aspect, the flash memory includes NOR flash memory.

In another embodiment of the second aspect, the SSD can further include a selection element attached to the circuit board. The selection element can enable the first set of contacts or the second set of contacts. In yet another embodiment of the second aspect, the SSD can include the first connector coupled to the first set of contacts. In a further embodiment of the second aspect, the SSD can the second connector coupled to the second set of contacts.

In a third aspect, an SSD can include a circuit board having first and second major surfaces and flash memory mounted on the first major surface or the second major surface. Additionally, the SSD can include a first set of contacts on the first major surface and a second set of contacts on the second major surface. The first set of contacts can be arranged to couple to a first connector and the second set of contacts can be arranged to couple to a second connector. Further, the SSD can include a selection element attached to the circuit board. The selection element can be configured to enable the first set of contacts or the second set of contacts. In an embodiment of the third aspect, the flash memory can include NAND flash memory. In another embodiment of the third aspect, the SSD can include the first connector coupled to the first set of contacts. The first connector can include a micro SATA connector. In a further embodiment of the third aspect, the SSD can include the second connector coupled to the second set of contacts. The second connector can include a SATA connector.

What is claimed is:

1. A storage device comprising:
   a first outer surface and a second outer surface opposite the first outer surface;
   a first set of contacts arranged to couple to a first connector;
   a second set of contacts arranged to couple to a second connector, wherein:
      the first outer surface is closer to the first set of contacts than the second set of contacts; and
      the second outer surface is closer to the second set of contacts than the first set of contacts; and
   a selection element attached to a circuit board, the selection element to enable the first set of contacts or the second set of contacts.

2. The storage device of claim 1, further comprising a circuit board having first and second major surfaces, wherein:
   the first set of contacts is disposed on the first major surface of the circuit board; and
   the second set of contacts is disposed on the second major surface of the circuit board.

3. The storage device of claim 1, wherein the first connector includes a micro SATA connector.

4. The storage device of claim 1, wherein the second connector includes a SATA connector.

5. The storage device of claim 1, further comprising non-volatile memory mounted on the first major surface or the second major surface.

6. The storage device of claim 5, wherein the non-volatile memory includes NAND flash memory.

7. The storage device of claim 5, wherein the non-volatile memory includes NOR flash memory.

8. The storage device of claim 1, further comprising a drive bracket connected to the circuit board, the drive bracket configured for mounting in a 2.5 inch drive bay.

9. The storage device of claim 1, further comprising a drive bracket connected to the circuit board, the drive bracket configured for mounting in a 3.5 inch drive bay.

10. An information handling system comprising:
    a processor; and
    a solid state drive in communication with the processor, the solid state drive including:
       a first outer surface and a second outer surface opposite the first outer surface;
       a first set of contacts arranged to couple to a first connector;
       a second set of contacts arranged to couple to a second connector, wherein:
          the first outer surface is closer to the first set of contacts than the second set of contacts; and
          the second outer surface is closer to the second set of contacts than the first set of contacts; and
       a selection element attached to the circuit board, the selection element to enable the first set of contacts or the second set of contacts.

11. The information handling system of claim 10, further comprising a circuit board having first and second major surfaces, wherein the first set of contacts is disposed on the first major surface of the circuit board and the second set of contacts is disposed on the second major surface of the circuit board.

12. The information handling system of claim 10, wherein the solid state drive further includes flash memory mounted on one of the first and second major surfaces.

13. The information handling system of claim 12, wherein the flash memory includes NAND flash memory.

14. The information handling system of claim 12, wherein the flash memory includes NOR flash memory.

15. The information handling system of claim 10, wherein the solid state drive further includes the first connector.

16. The information handling system of claim 10, wherein the solid state drive further includes the second connector.

17. A solid state drive comprising:
    a first outer surface and a second outer surface opposite the first outer surface;
    a circuit board having first and second major surfaces;
    flash memory mounted on the first major surface or the second major surface;
    a first set of contacts arranged to couple to a first connector and a second set of contacts arranged to couple to a second connector; and
    a selection element attached to the circuit board, the selection element to enable the first set of contacts or the second set of contacts, wherein:
       the first outer surface is closer to the first set of contacts than the second set of contacts; and
       the second outer surface is closer to the second set of contacts than the first set of contacts.

18. The solid state drive of claim 17, wherein the first set of contacts is disposed on the first major surface of the circuit board and the second set of contacts is disposed on the second major surface of the circuit board.

19. The solid state drive of claim 17, wherein the flash memory includes NAND flash memory.

20. The solid state drive of claim 17, further comprising the first connector, the first connector including a micro SATA connector.

21. The solid state drive of claim 17, further comprising the second connector, the second connector including a SATA connector.

* * * * *